J. BECKER.
TRANSMISSION MECHANISM FOR MILLING MACHINES.
APPLICATION FILED FEB. 23, 1909.

1,050,792.

Patented Jan. 21, 1913.

5 SHEETS—SHEET 3.

Witnesses:
Edwin T. Luce
Robert H. Kammler.

Inventor:
John Becker,
by Emery & Booth
Attys.

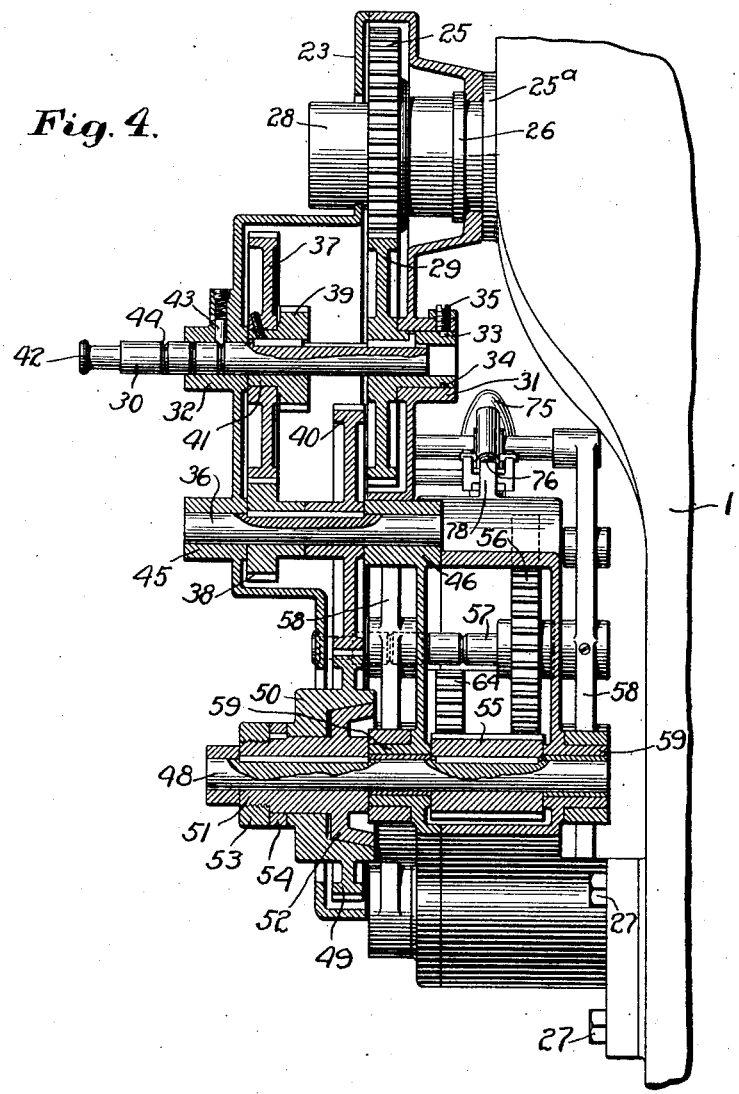

J. BECKER.
TRANSMISSION MECHANISM FOR MILLING MACHINES.
APPLICATION FILED FEB. 23, 1909.
1,050,792.
Patented Jan. 21, 1913.
5 SHEETS—SHEET 5.
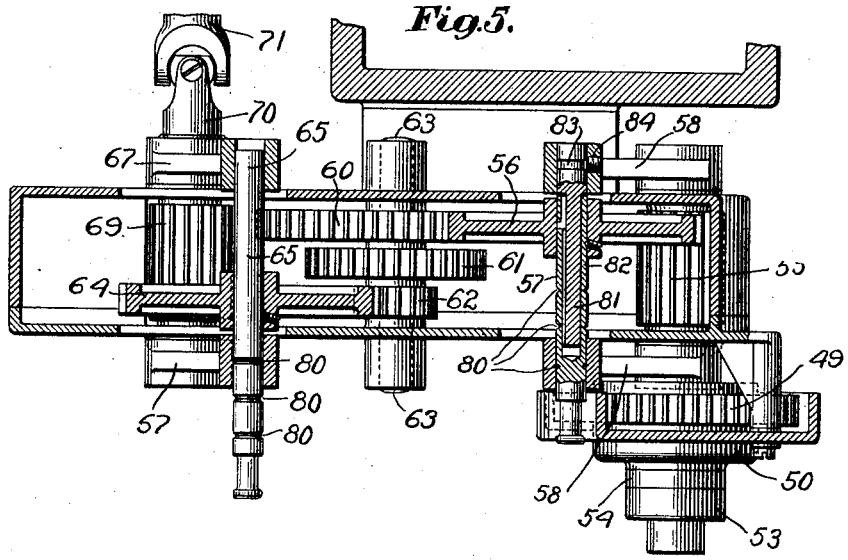
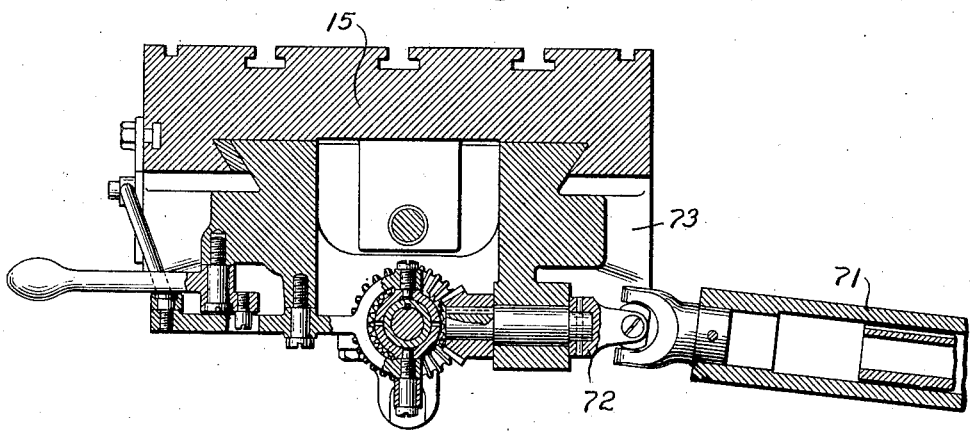
Witnesses:
Edwin T. Luce
Robert H. Kammler.
Inventor:
John Becker,
by Emery & Booth
Att'ys.

UNITED STATES PATENT OFFICE.

JOHN BECKER, OF HYDE PARK, MASSACHUSETTS, ASSIGNOR TO BECKER MILLING MACHINE COMPANY, OF PORTLAND, MAINE, A CORPORATION OF MAINE.

TRANSMISSION MECHANISM FOR MILLING-MACHINES.

1,050,792.  Specification of Letters Patent.  Patented Jan. 21, 1913.

Application filed February 23, 1909. Serial No. 479,547.

*To all whom it may concern:*

Be it known that I, JOHN BECKER, a citizen of the United States, and a resident of Hyde Park, in the county of Norfolk and Commonwealth of Massachusetts, have invented an Improvement in Transmission Mechanism for Milling-Machines and the Like, of which the following description, in connection with the accompanying drawings, is a specification, like letters on the drawings representing like parts.

My invention aims to provide a novel transmission or driving mechanism, particularly adapted for machine tools, such, for example, as milling machines.

To enable my invention to be readily understood, I have herein elected to disclose the same as embodied in a typical horizontal milling machine illustrated in the accompanying drawings, wherein,—

Figure 1:
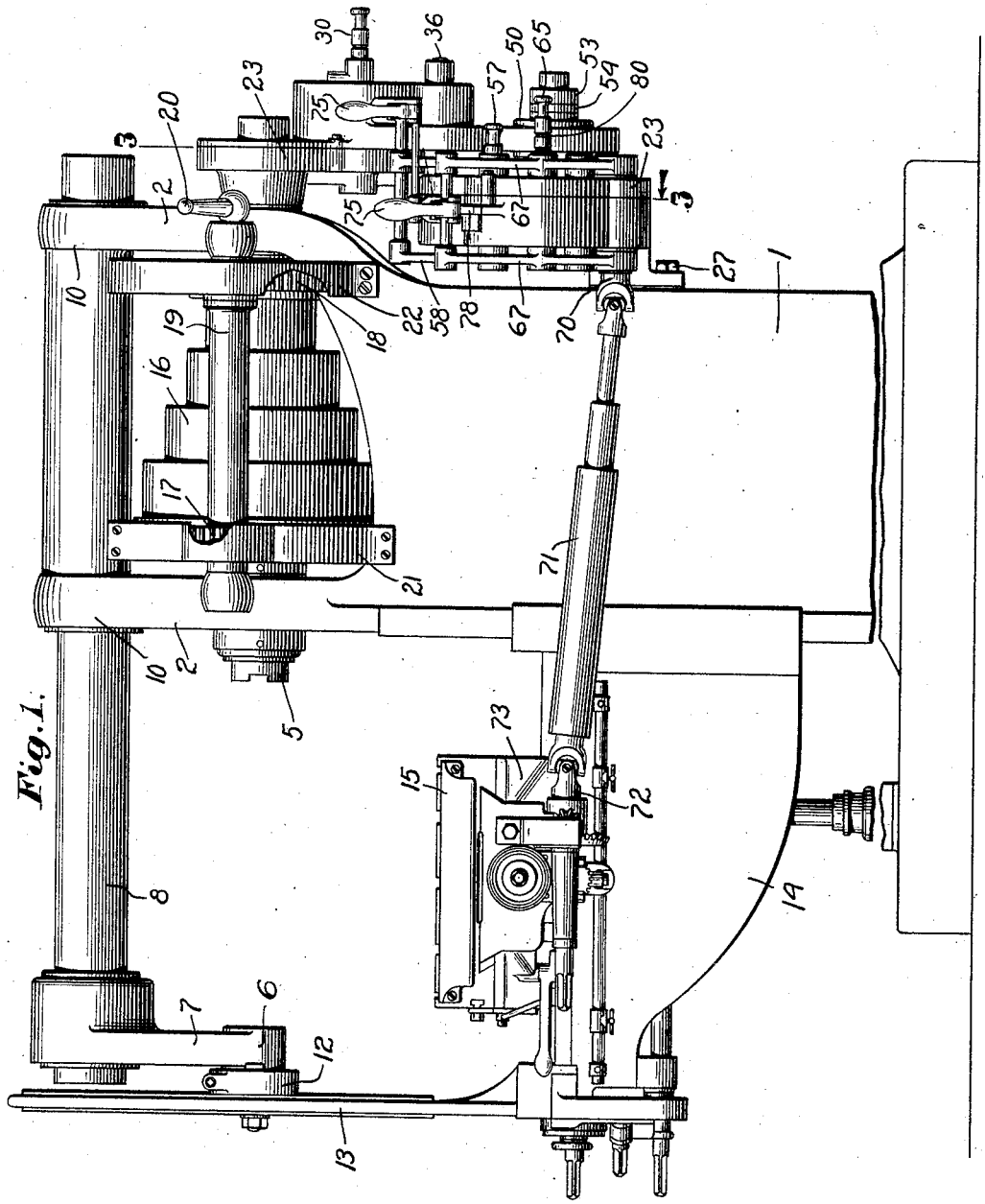
Figure 2:
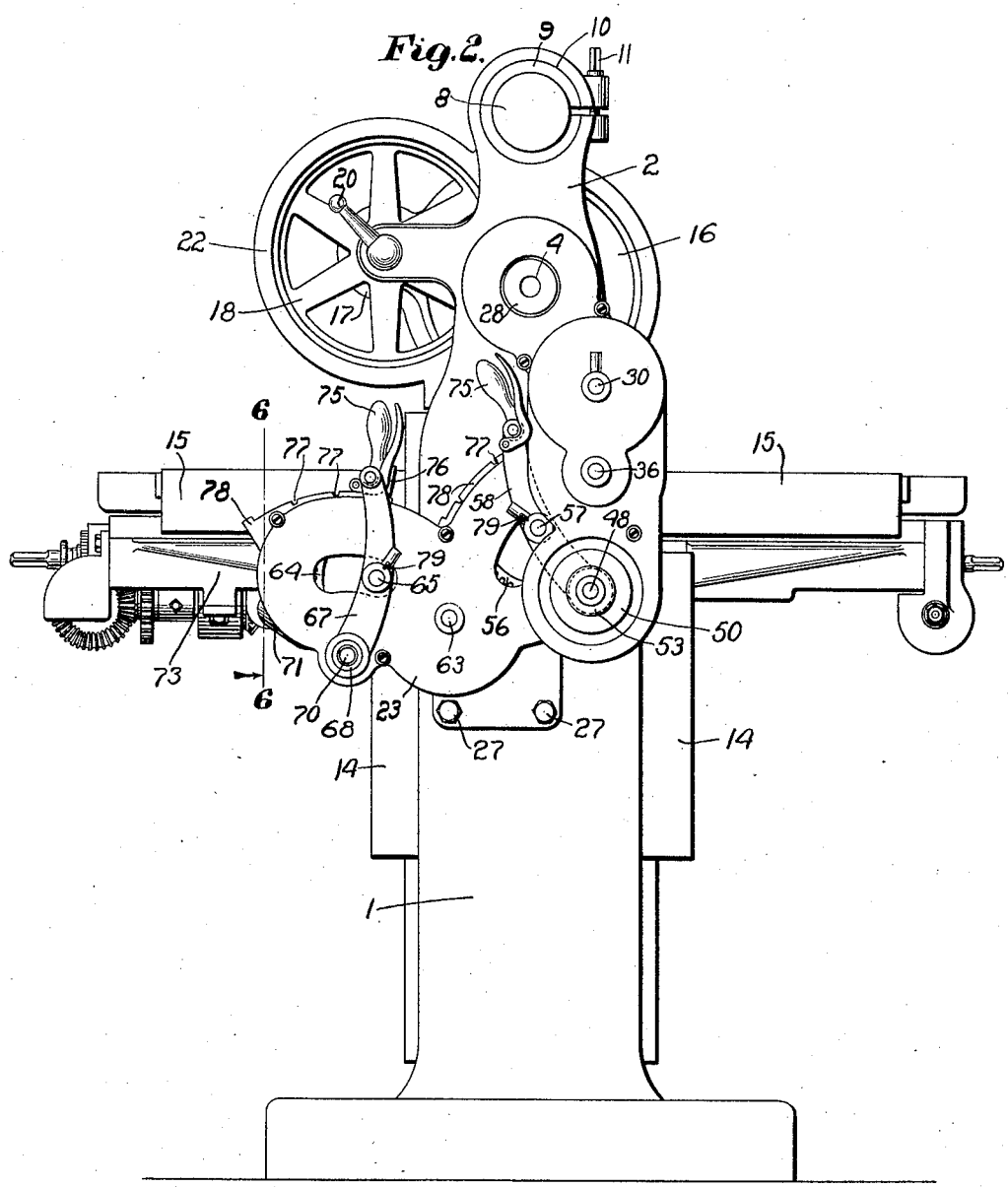
Figure 3:
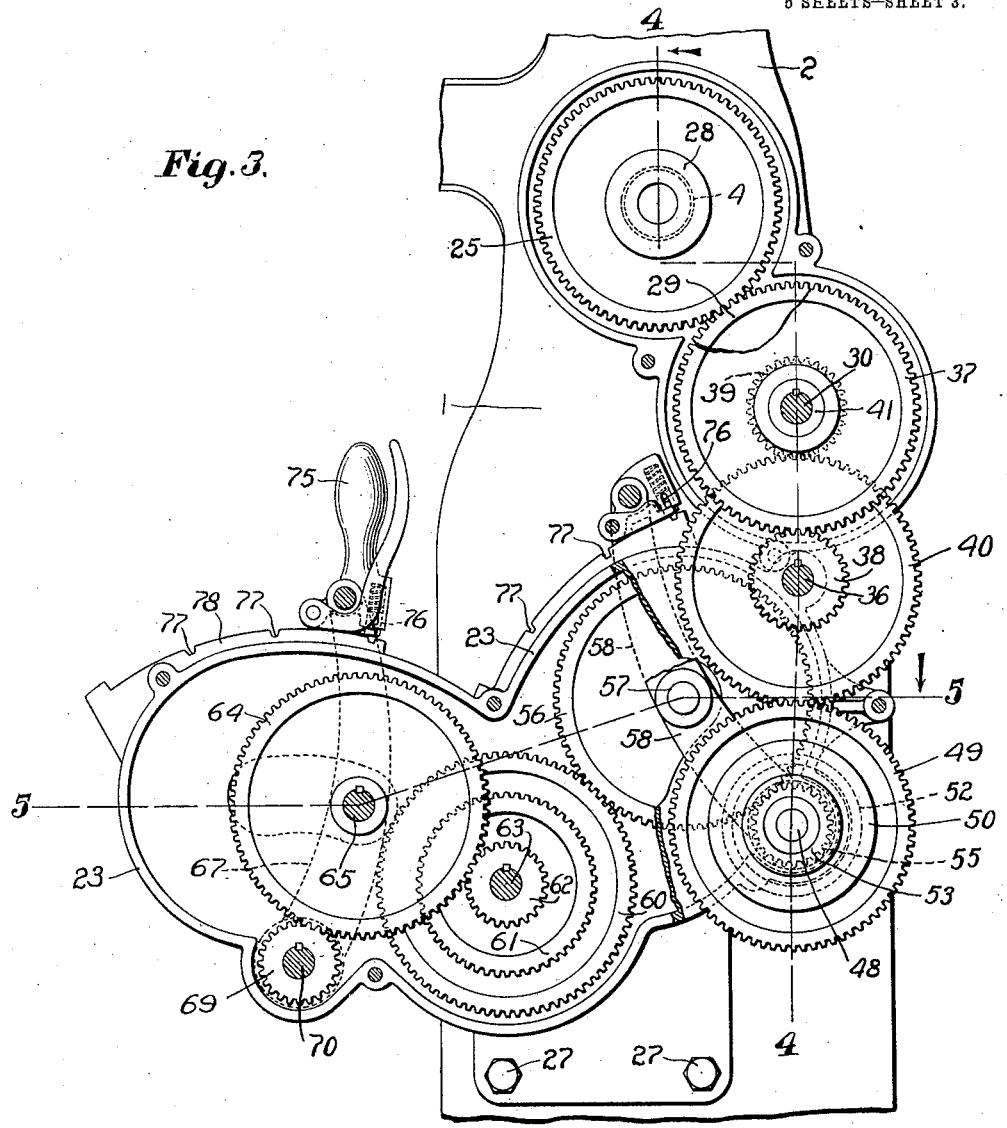

Figure 1 is a side elevation of a horizontal milling machine embodying my invention; Fig. 2 is a view of Fig. 1; looking toward the left. Fig. 3 is an enlarged sectional view taken on the line 3—3 of Fig. 1, looking toward the left; Fig. 4 is a sectional view taken on the dotted line 4—4 of Fig. 3; Fig. 5 is a section on the dotted line 5—5 of Fig. 3, looking downward; and Fig. 6 is an enlarged section taken on the dotted line 6—6 of Fig. 2, looking toward the right.

In the drawings, referring to Fig. 1, a horizontal milling machine is employed as illustrating any machine to which my invention is or may be adapted, said machine herein comprising a vertical column 1, having vertical arms 2 furnishing bearings for a horizontal tool spindle shaft 4, shown in Fig. 2, having a head 5 to receive any suitable tool or arbor, not shown herein. For heavy work the outer or free end of said arbor may be supported by an out-board bearing 6 in the arm 7, depending from the overhanging arm 8, which is adjustably mounted in a split sleeve 9 see Fig. 2 clamped in the split bearings 10 in the upper ends of said arms 2. The out-board bearing 6 may be steadied by a block 12 adjustably mounted in the usual upright 13. When not in use the pendant arm 7 may be swung upward or outward. Below said spindle on the front of the column 1 is the usual knee 14, fitted to slide vertically on said column and supporting the usual work table 15.

The tool spindle 4 (Fig. 1) referred to may be driven directly from a cone pulley 16 thereon, and additional spindle speeds may be obtained by driving the spindle through the back gears 17 and 18 (Fig. 1) mounted on the shaft 19, supported in bearings projecting from said arms 2. The back gears 17 and 18 may be thrown into and out of mesh with the spindle gears by the usual handle 20, and may be protected by the usual light guards 21 and 22.

The great variety of work now performed upon milling machines makes it necessary to provide for a great variety of speeds at which the work shall be fed. It is also desirable to provide a simple mechanism for effecting the change from one speed to another which will have its control obvious and quickly operable without the necessity, as in previous practice, of consulting a reference dial before making said speed changes. The machine described herein is provided with mechanism to meet these requirements.

Referring more particularly to Figs. 2 and 3, the tool spindle 4 and work table 15 are operably connected by means including a plural tumble mechanism, herein shown as inclosed by a two-part separable casing 23 (Figs. 1, 2 and 4), the inner part of which is herein shown with its inner upper end encircling the hub of a spur gear 25 which is splined on the rear end of said tool spindle 4, said frame being held in position by a collar 26 (see Fig. 4) on said hub. The inner part of the casing depends from said boss following the contour of the gears which it incloses, and is bolted to the column 1 near the base thereof at 27. Axial movement of said gear 25 is prevented by the engagement of its hub with a bearing face 25$^a$ on the column 1 and a cap 28 screwed on the end of the spindle 4. This gear 25 drives a gear 29 beneath it, said gear being splined upon a shaft 30 journaled in outwardly projecting bosses 31 and 32 on said casing. To prevent axial movement of said gear 29 while permitting said shaft 30 to be slid through it, said gear is provided with an inwardly extended hub 23 (Fig. 4), having a peripheral groove 34 which is engaged by a pin 35 mounted in said boss 31. Below the shaft 30 is another and parallel shaft 36, to which two speeds may be transmitted by a gear 37 and a pinion 39 fast to the sliding shaft 30 on which the gear 29 is mounted. To transmit one speed to the shaft 36 the shaft 30 is moved longitudinally in its bearings to cause the gear 37 to mesh with a pinion 38 fixed to said shaft 36 and to transmit a different speed thereto the shaft 30 may be slid inwardly to throw the gear 37 out of mesh with the pinion 38 and bring the pinion 39 in mesh with a gear 40 also fast on said shaft 36. The shaft 30 with said gear 37 and pinion 39 may be moved longitudinally as described by a suitable knob 42 on the outer end thereof, said shaft being retained in its adjusted positions by a suitable locking means, shown herein as a spring pressed latch 43 engaging one or another of the peripheral grooves 44 in said shaft.

Below the shaft 36 is another parallel shaft 48, journaled in bearings in the casing 23, and may be driven from the gear 40 on said shaft 36 by a gear 49 containing a friction cup 50 (see Fig. 4) which is loosely mounted on the hub 51 of a friction cone 52, said hub being splined to said shaft 48. This cone and cup may be pressed into frictional engagement by a nut 53 screwed onto the outer end of the hub 51 of the friction cone 52 and engaging a washer 54 interposed between said hub and nut. To prevent injury to the tool, the work treated or to the machine, such as is liable to occur when there is any abnormal resistance between the tool and work fed thereto the frictional engagement between said cone and cup may be adjusted to permit one to slip on the other, at the occurrence of this excess resistance. Rotation is transmitted from said shaft 48 through a wide faced pinion 55 (see Figs. 3, 4, and 5) fixed thereon, meshing with a tumbler gear 56 fast on a shaft 57 journaled in arms 58 fulcrumed about the bosses 59, which extend outwardly from said casing and also constitute bearings for said shaft 48. This tumbler gear 56 is also adapted to mesh with and drive any one of a number of change gears such as 60, 61 and 62, fast on a shaft 63 journaled in bearings on said casing. The drive may be transmitted through any of these change gears to an adjustable tumbler gear 64, similar to the tumbler gear 56 described and mounted fast on a shaft 65 journaled in the free ends of arms 67 fulcrumed about bosses 68 projecting from said casing 23. The tumbler gear 64 meshes with and drives a wide faced pinion 69 fast on a shaft 70 journaled in said bosses 68. This shaft 70 projects from the casing 23 (see Figs. 1 and 5) and is provided with a universal connection with one end of a telescopic shaft 71, the opposite end of which has a similar universal connection with a short shaft 72 (see Fig. 6) journaled in the bed 73 supported on said knee 14 and adapted to drive the usual devices for feeding the work table or any other mechanism as desired. As stated the tumbler gears 56 and 64 are adapted to be thrown in mesh with any one of said change gears 60, 61 and 62. Since the latter are of different sizes and in different planes it is necessary to swing the tumbler gears toward and from the change gear shaft 63 and also move said gears axially to bring them opposite to the desired gears. To effect said swinging movement said tumbler gears may be swung with their supporting arms about the axes of the shafts carrying the wide faced pinions 55 and 69 respectively, and will therefore always be in mesh with said pinions whatever their position.

To retain the swinging arms 58 and 67 in their adjusted positions, said arms are extended upwardly outside of said casing and are provided with handles 75 (see Figs. 2 and 3) having spring pressed latches 76 adapted to engage anyone of a number of notches 77 on the arcuate edges of segments 78 projecting upwardly from said casing 23.

As stated it is also necessary to adjust the tumbler gears axially. To this end said gears are mounted fast on their shafts 57 and 65 respectively (see Fig. 5) and said shafts may be moved longitudinally to slide said tumbler gears along the faces of the wide faced pinions 55 and 69 to bring said gears opposite to any of the change gears 60, 61 and 62 described. These tumbler shafts may be retained in their positions of longitudinal adjustment by spring pressed latches 79 (see Fig. 2) in the outer tumbler shaft bearings. Said latches are adapted to engage anyone of a number of peripheral grooves 80 (see Fig. 5) spaced proper distances to locate the tumbler gears in line with the various change gears.

In mounting the tumbler gears fast on their supporting shafts and journaling the latter in arms having their opposite ends positively retained in their adjusted positions the tumbler gears are firmly held up to the gears with which they mesh, reducing liability of backlash and looseness of parts to a minimum.

It will be observed by referring to Fig. 5 that the longitudinal movement of the tumbler shaft 57 at the right of said figure is limited by the rear side of the adjacent column 1. To give the tumbler gear 56 on said shaft its necessary axial movement this shaft is herein constructed of two parts 81 and 82 (see Fig. 5) one telescoping the other, said parts being splined together. The shaft 81 is prevented from moving axially by a peripheral groove 83 thereon engaged by a pin 84 recessed in its bearing. The tumbler gear 56 is mounted fast on the sleeve part 82 which may be slip longitudinally on the shaft 81 to adjust said gear as desired.

The mechanism operated by this tumbler gear transmission may be readily stopped by sliding one of said gears out of mesh with its change gear or by swinging said tumbler away therefrom.

It will be apparent that by adjusting the tumbler gears 55 and 64 into various combinations with the change gears 60, 61 and 62 on the intermediate shaft a great variety of speeds may be obtained with very few and simple adjustments. The tumbler gear 56 may be adjusted to mesh with gears 60, 61 or 62 while the tumbler gear 64 is in mesh with any one of said gears 60, 61 and 62, thereby giving a capability of nine different combinations. But seven different speeds will be obtained by these nine combinations since when both tumbler gears are meshing with the same change gear the latter acts as an idler without any change in the speed transmitted. Herein three change speed gears are shown, but it will be understood that any number may be used, and to illustrate the manner in which the speeds multiply with the addition of each change gear it may be supposed that two change gears as 60 and 61 are used, thus giving a capability of four speed adjustments. If three change gears such as 60, 61 and 62 are used nine speed adjustments are obtained and if four change gears were used sixteen speed adjustments would be obtained.

By the meshing and coöperation of both tumbler gears with any of the said intermediate change gears a number of speed adjustments may be obtained equal to the square of the number of change gears used, whereas if but one tumbler gear were used with a series of gears on a change gear shaft, the number of speed adjustments would be equal only to the number of gears used and again if the tumbler gears did not coöperate as described above but were separated, occupying positions independently to connect separated portions of the train of gears from the tool spindle to the work table the said gears could not supply the increased variety of speeds described. It is by bringing said tumbler gears together with the single intermediate shaft that the above referred to variety and wide range of speed are effected.

With the milling machine change gear mechanism described herein a large variety of speeds is obtained with few and simple parts. It is not necessary for the operative to consult an index before making his speed changes, but by glancing at the positions of his handles, he can with a little practice immediately recognize just what positions his gears are in and just what speed will be obtained by changing said handles to new positions.

So far as known to me it is broadly new to provide a plural tumbler mechanism wherein the several tumbler gears and their shafts with the intermediate transmission shaft are combined as herein to produce a maximum number of speed changes with a minimum number of gears and shafts.

The plural tumbler gear mechanism described herein is simple in construction, compact, readily accessible for purpose of adjustment and oiling, and has a wide range and variety of speeds which are impossible in the present art except by the use of an exceedingly complex mechanism.

It will be understood that my invention is not limited to the particular embodiment shown herein, but that various modifications may be made without departing from the spirit of my invention.

Claims—

1. A mechanism of the class described comprising, in combination, a plurality of gears; a tumbler gear carrier adjustable relatively to said gears; a shaft journaled and axially adjustable in said carrier; a tumbler gear fast on said shaft and means to retain said shaft in different positions of axial adjustment.

2. A mechanism of the class described comprising, in combination, a plurality of gears; a tumbler gear carrier; a shaft journaled in said carrier; a tumbler gear fast on said shaft; and a casing containing said gears, said shaft projecting exteriorly of said casing and manually adjustable in the direction of its axis.

3. A mechanism of the class described comprising, in combination, a plurality of gears; a tumbler gear carrier having bearings; a shaft journaled in said bearings and adjustable in the direction of its axis relatively to said gears; a tumbler gear fast on said shaft; said shaft having a series of spaced peripheral grooves indicating different positions of adjustment of said shaft and latch means for coöperation with said grooves to secure said shaft in different positions of adjustment.

4. A mechanism of the class described comprising, in combination, a plurality of gears; a tumbler gear carrier; a shaft journaled therein; and a tumbler gear fast to the latter, said shaft being manually adjustable in the direction of its axis.

5. A mechanism of the class described comprising, in combination, different sized gears; tumbler gears adapted to engage therewith; shafts fast to said tumbler gears; carriers having bearings for said shafts; the latter being adjustable in the directions of their axes in said bearings; means to lock said shafts in different positions of axial adjustment and means to move said shafts with their tumbler gears toward and from said different sized gears; said means having provision for securing said carriers in different positions of adjustment.

6. A mechanism of the class described comprising, in combination, a plurality of gears; a tumbler gear coöperating therewith; a plural part shaft for said tumbler gear; one part thereof being movable and the other part thereof being immovable axially; and means for locking said movable part in different positions of adjustment.

7. A mechanism of the class described comprising, in combination, shafts; gears thereon; fulcrumed tumbler gear carriers; means to adjust and retain the latter in different positions; bearings in said carriers intermediate the fulcra of the latter and said adjustable retention means; a tumbler shaft axially adjustable in said bearings; and a tumbler gear fast on said shaft adapted to mesh with said gears.

In testimony whereof, I have signed my name to this specification, in the presence of two subscribing witnesses.

JOHN BECKER.

Witnesses:
 EVERETT S. EMERY,
 HENRY T. WILLIAMS.

---

Copies of this patent may be obtained for five cents each, by addressing the "Commissioner of Patents, Washington, D. C."